(12) United States Patent
Watanabe et al.

(10) Patent No.: US 12,081,704 B2
(45) Date of Patent: Sep. 3, 2024

(54) IMAGE FORMING DEVICE AND CONTROL METHOD FOR PRINTING ADJUSTMENT PATTERNS

(71) Applicant: SEIKO EPSON CORPORATION, Tokyo (JP)

(72) Inventors: Ikumi Watanabe, Shiojiri (JP); Masahiro Someno, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 18/182,218

(22) Filed: Mar. 10, 2023

(65) Prior Publication Data

US 2023/0291843 A1   Sep. 14, 2023

(30) Foreign Application Priority Data

Mar. 11, 2022   (JP) .................................. 2022-038062

(51) Int. Cl.
*H04N 1/00* (2006.01)

(52) U.S. Cl.
CPC ..... *H04N 1/00045* (2013.01); *H04N 1/00034* (2013.01); *H04N 1/00042* (2013.01)

(58) Field of Classification Search
CPC ........... H04N 1/00045; H04N 1/00034; H04N 1/00042
See application file for complete search history.

(56) References Cited

U.S. PATENT DOCUMENTS

| 2004/0114157 A1* | 6/2004 | Linder ................. H04N 1/6033 358/1.9 |
| 2023/0090095 A1* | 3/2023 | Takemura .......... H04N 1/00015 358/1.9 |
| 2023/0141186 A1* | 5/2023 | Koda ..................... G06F 3/128 358/1.15 |
| 2023/0283722 A1* | 9/2023 | Hidaka .............. G06K 15/1876 358/3.13 |

FOREIGN PATENT DOCUMENTS

| JP | 2008-277999 A | 11/2008 |
| JP | 2019-171667 A | 10/2019 |

* cited by examiner

*Primary Examiner* — Peter K Huntsinger
(74) *Attorney, Agent, or Firm* — WORKMAN NYDEGGER (57) ABSTRACT

An image forming device includes: a scanner mechanism; an inkjet-type print mechanism; a display mechanism; and a control unit configured to control the scanner mechanism, the print mechanism, and the display mechanism. The control unit includes a pattern storage unit configured to store a temperature, a humidity, and an adjustment pattern group including a plurality of adjustment patterns, in association with each other, an acquisition unit configured to acquire a measured temperature and a measured humidity from a temperature and humidity sensor, and a data generation unit configured to read an adjustment pattern group corresponding to the measured temperature and the measured humidity acquired by the acquisition unit from the pattern storage unit, and generate print data including the read adjustment (Continued)

pattern group and first group identification information which is information for identifying the adjustment pattern group.

8 Claims, 8 Drawing Sheets

| HUMIDITY H (%) | TEMPERATURE T (°C) | | |
|---|---|---|---|
| | 0~10 | ~20 | ~30 |
| ~33 | A | B | C |
| ~66 | D | E | F |
| ~100 | G | H | I |

TB1

DPS

FIG. 4

| GROUP IDENTIFICATION SYMBOL DPS | FIRST PATTERN NUMBER PN1 | SECOND PATTERN NUMBER PN2 | THIRD PATTERN NUMBER PN3 | FOURTH PATTERN NUMBER PN4 |
|---|---|---|---|---|
| A | 1 | 3 | 4 | 5 |
| B | 1 | 3 | 5 | 6 |
| C | 1 | 6 | 7 | 8 |
| D | 2 | 4 | 5 | 6 |
| E | 2 | 4 | 5 | 7 |
| ... | ... | ... | ... | ... |

IMAGE FORMING DEVICE AND CONTROL METHOD FOR PRINTING ADJUSTMENT PATTERNS

The present application is based on, and claims priority from JP Application Serial Number 2022-038062, filed Mar. 11, 2022, the disclosure of which is hereby incorporated by reference herein in its entirety.

BACKGROUND

1. Technical Field

The present disclosure relates to an image forming device and a control method of an image forming device.

2. Related Art

JP-A-2019-171667 discloses a printing device that scans an inspection pattern, which is divided into two and printed, with a scanner and performs a correction processing of a printing condition.

In the printing device disclosed in JP-A-2019-171667, when a user adjusts parameters such as a color tone of printing of the printing device using an adjustment pattern, it is necessary to read an adjustment pattern printed on an adjustment sheet with a scanner.

However, when the user erroneously reads an adjustment pattern printed on an inappropriate adjustment sheet with the scanner, there is a chance that the print mechanism cannot be appropriately adjusted.

SUMMARY

According to an aspect of the present disclosure, an image forming device includes: a scanner mechanism; an inkjet-type print mechanism; a display mechanism; and a control unit configured to control the scanner mechanism, the print mechanism, and the display mechanism. The control unit includes a pattern storage unit configured to store a temperature, a humidity, and an adjustment pattern group including a plurality of adjustment patterns, in association with each other, an acquisition unit configured to acquire a measured temperature and a measured humidity from a temperature and humidity sensor, a data generation unit configured to read an adjustment pattern group corresponding to the measured temperature and the measured humidity acquired by the acquisition unit from the pattern storage unit, and generate print data including the read adjustment pattern group and first group identification information which is information for identifying the adjustment pattern group, and an image generation unit configured to read, by the scanner mechanism, the adjustment pattern group formed on an adjustment sheet and generate an image group corresponding to the adjustment pattern group. The image generation unit is configured to read, by the scanner mechanism, an image corresponding to group identification information formed on the adjustment sheet, and acquire second group identification information.

According to another aspect of the present disclosure, a control method of an image forming device is provided. The image forming device includes a scanner mechanism, an inkjet-type print mechanism, a display mechanism, and a control unit configured to control the scanner mechanism, the print mechanism, and the display mechanism. The control unit includes a pattern storage unit configured to store a temperature, a humidity, and an adjustment pattern group including a plurality of adjustment patterns, in association with each other. The control unit executes an acquisition step of acquiring a measured temperature and a measured humidity from a temperature and humidity sensor; and a data generation step of reading an adjustment pattern group corresponding to the measured temperature and the measured humidity acquired in the acquisition step from the pattern storage unit, and generating print data including the read adjustment pattern group and first group identification information which is information for identifying the adjustment pattern group.

DESCRIPTION OF EXEMPLARY EMBODIMENTS

Hereinafter, an embodiment will be described with reference to the drawings.

Figure 1:
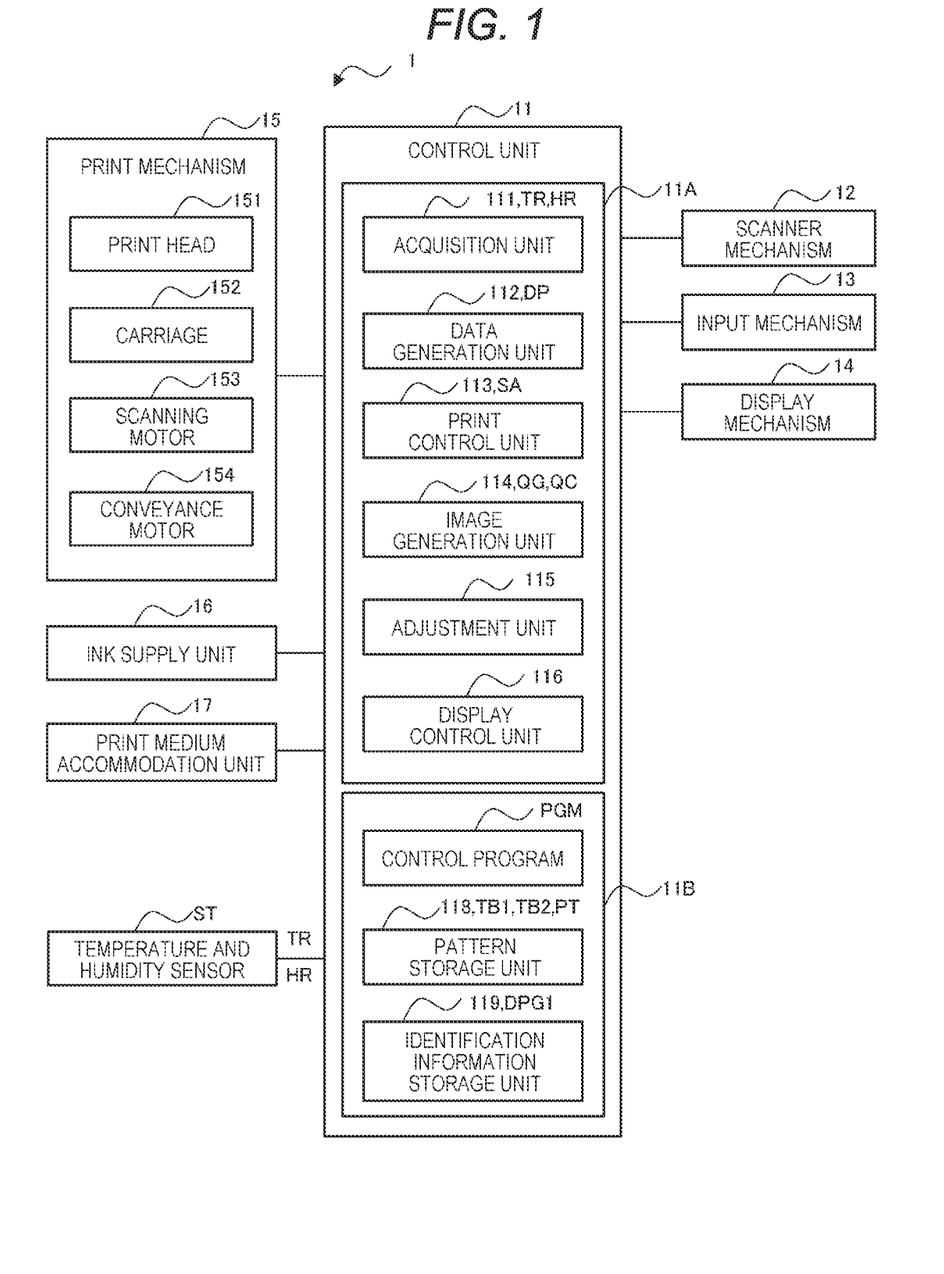
FIG. 1 is a diagram showing an example of a configuration of a multifunction peripheral according to an embodiment.

A multifunction peripheral 1 according to the embodiment will be described. FIG. 1 is a diagram showing an example of a configuration of the multifunction peripheral 1 according to the embodiment.

The multifunction peripheral 1 corresponds to an example of an "image forming device". The multifunction peripheral 1 is a device that prints images such as characters and figures on a print medium M such as a print sheet.

As shown in FIG. 1, the multifunction peripheral 1 includes a control unit 11, a scanner mechanism 12, an input mechanism 13, a display mechanism 14, a print mechanism 15, an ink supply unit 16, a print medium accommodation unit 17, and a temperature and humidity sensor ST.

The control unit 11 includes a processor 11A such as a central processing unit (CPU) and a memory 11B such as a read only memory (ROM) and a random access memory (RAM), and controls each unit of the multifunction peripheral 1. The memory 11B stores a control program PGM. The memory 11B may include a magnetic storage device such as a hard disk drive (HDD) or a semiconductor storage device such as a solid state drive (SSD).

In the control unit 11, the processor 11A reads the control program PGM stored in the memory 11B and executes processing. In other words, the control unit 11 executes the processing by cooperation of hardware and software.

The processor 11A may be a single processor, or a plurality of processors may function as the processor 11A.

In the embodiment, the processor 11A executes the control program PGM to control each unit of the multifunction peripheral 1, whereas the present disclosure is not limited thereto. The control unit 11 may be, for example, an application specific integrated circuit (ASIC). The ASIC may execute processing by an implemented function. The control unit 11 may be, for example, a signal processing circuit. The signal processing circuit may perform a signal processing and execute the processing.

The scanner mechanism 12 includes an image sensor such as a charge coupled device (CCD), a complementary metal oxide semiconductor (CMOS), or a contact image sensor (CIS), reads the image printed on the print medium M such as the print sheet, and generates image data.

Figure 5:
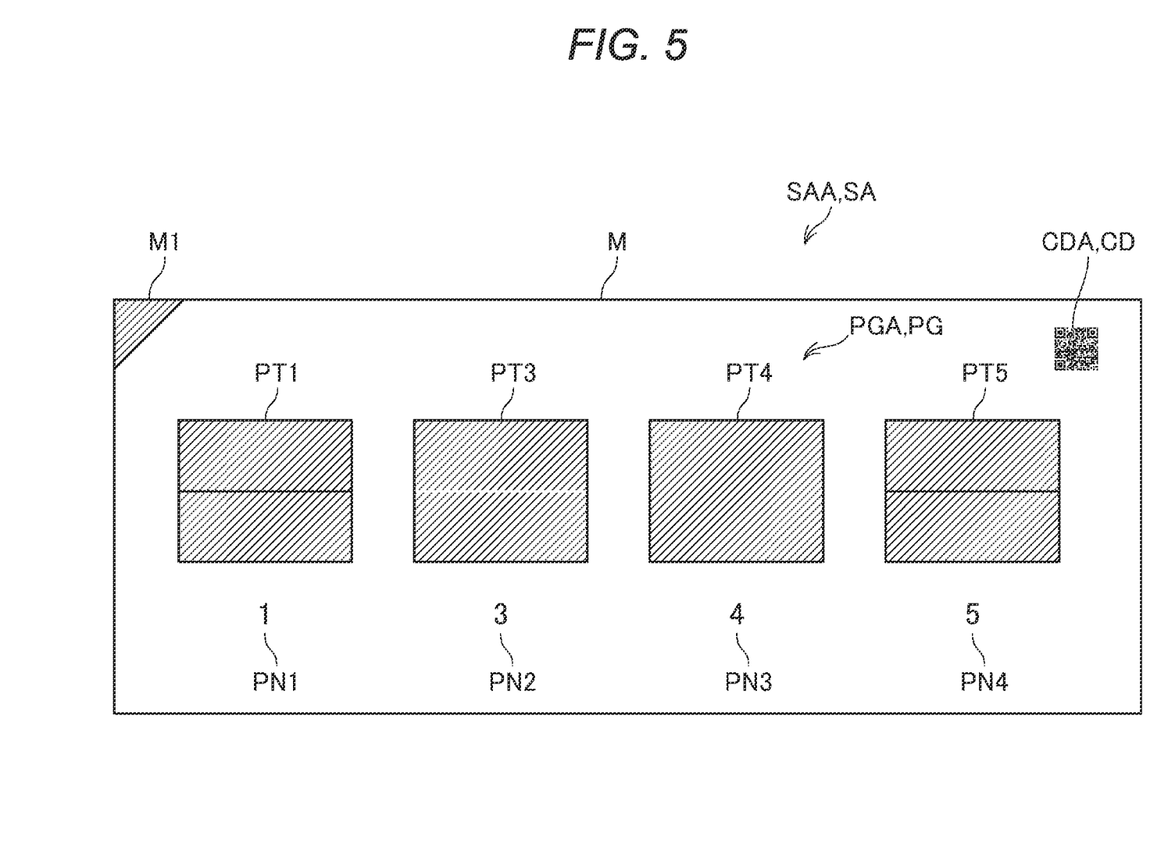
FIG. 5 is a diagram showing an example of an adjustment sheet, an adjustment pattern group, and a code.
Figure 6:
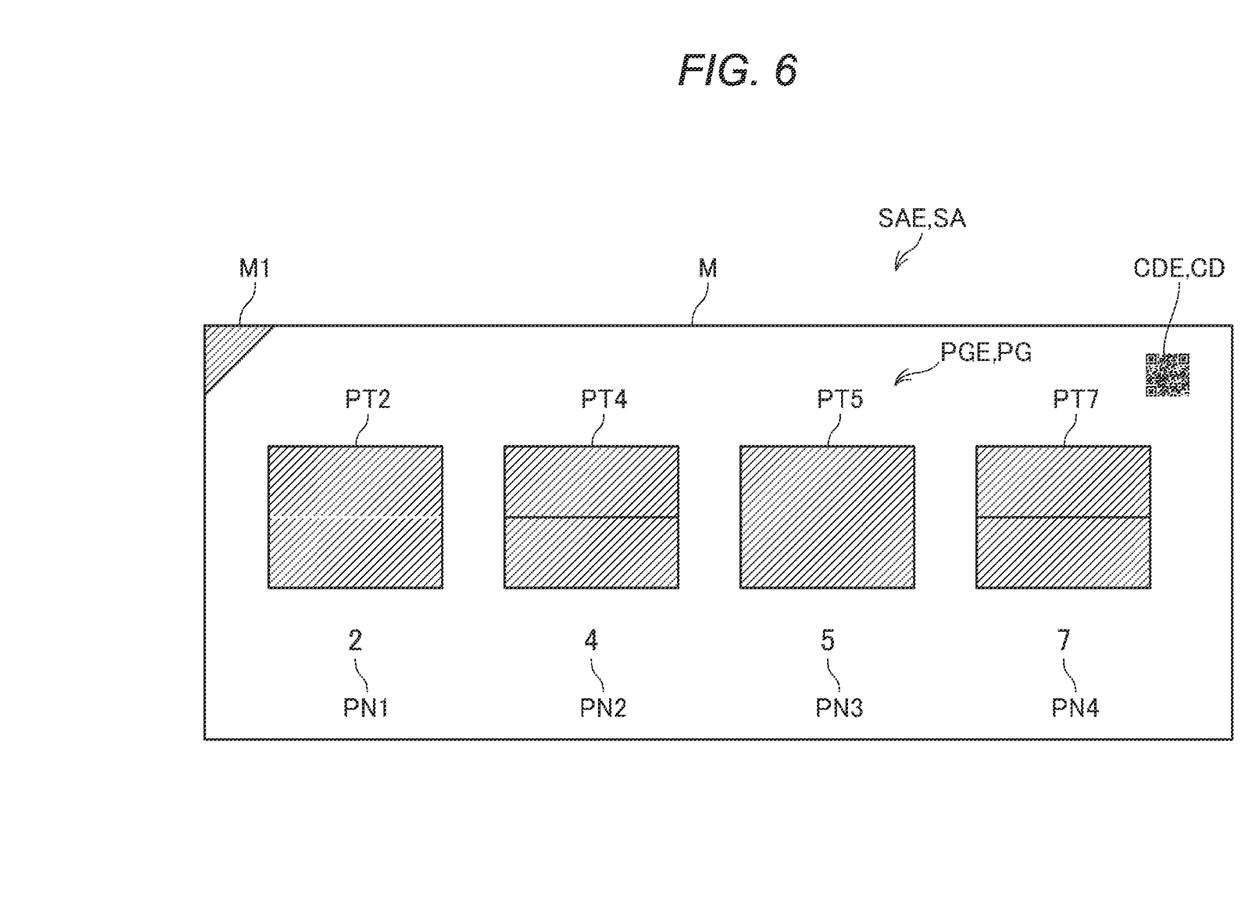
FIG. 6 is a diagram showing another example of the adjustment sheet, the adjustment pattern group, and the code.

In the embodiment, the scanner mechanism 12 reads an adjustment pattern group PG shown in FIGS. 5 and 6, and generates an adjustment image group QG. The scanner mechanism 12 reads a code CD shown in FIGS. 5 and 6, and generates a code image QC.

The input mechanism 13 includes an input unit such as an operation switch or a touch panel provided in the multifunction peripheral 1, detects an operation performed on the input unit by a user, and outputs a detection signal corresponding to the operation to the control unit 11. The control unit 11 executes processing corresponding to an operation of the user based on an input signal from the input mechanism 13.

The display mechanism 14 includes a plurality of light emitting diodes (LEDs), a display panel, and the like, and executes turning on, turning off, and blinking of the LEDs in a predetermined mode, display of information on the display panel, and the like under the control of the control unit 11.

The print mechanism 15 prints images such as characters and figures on the print medium M such as the print sheet with an ink under the control of the control unit 11. The print mechanism 15 includes a print head 151, a carriage 152, a scanning motor 153, and a conveyance motor 154 as components related to printing.

The print head 151 is of an inkjet type, and dispenses an ink supplied from the ink supply unit 16 toward the print medium M. The carriage 152 has the print head 151 mounted thereon, and performs scanning in a main scanning direction X intersecting with a sub-scanning direction Y. The sub-scanning direction Y indicates a conveyance direction of the print medium M. The scanning motor 153 performs scanning by the carriage 152 in the main scanning direction X. The conveyance motor 154 conveys the print medium M in the conveyance direction, that is, the sub-scanning direction Y.

The print mechanism 15 will be further described with reference to FIG. 2.

The ink supply unit 16 accommodates an ink tank that stores the ink, and supplies the ink from the ink tank to the print head 151 of the print mechanism 15. The ink supplied to the print head 151 by the ink supply unit 16 is, for example, an ink of each color of cyan (C), magenta (M), yellow (Y), and black (K).

The print medium accommodation unit 17 accommodates the print medium M. When the print medium M is a cut sheet, the print medium accommodation unit 17 feeds the stored cut sheet to a conveyance path (not shown) by conveyance of the conveyance motor 154. The print medium accommodation unit 17 may collect a printed object which is the print medium M after printing. The configuration for collecting the printed object may be a configuration in which cut sheets are stacked and placed.

The temperature and humidity sensor ST detects, for example, a temperature T and a humidity H around the print mechanism 15. The temperature and humidity sensor ST includes a temperature sensor and a humidity sensor. The temperature sensor includes a resistance temperature detector, a linear resistor, a thermistor, or the like. The humidity sensor includes a resistance change type humidity sensor, a capacitance change type humidity sensor, or the like.

The temperature and humidity sensor ST is disposed, for example, inside a housing in which the print mechanism 15 is accommodated. The temperature and humidity sensor ST outputs, to the control unit, a signal indicating a measured temperature TR measured by the temperature sensor and a signal indicating a measured humidity HR measured by the humidity sensor.

Next, functional blocks included in the control unit 11 of the multifunction peripheral 1 will be described.

The control unit 11 includes, as the functional blocks, an acquisition unit 111, a data generation unit 112, a print control unit 113, an image generation unit 114, an adjustment unit 115, a display control unit 116, a pattern storage unit 118, and an identification information storage unit 119.

When the processor 11A executes the control program PGM, the control unit 11 functions as the acquisition unit 111, the data generation unit 112, the print control unit 113, the image generation unit 114, the adjustment unit 115, and the display control unit 116. When the processor 11A executes the control program PGM, the control unit 11 controls the memory 11B to function as the pattern storage unit 118 and the identification information storage unit 119.

The control unit 11 detects a dispensing failure of a nozzle 39 disposed in the print head 151 of the print mechanism 15. For example, the print head 151 includes a residual vibration detection circuit (not shown). The control unit 11 detects the dispensing failure of each nozzle 39 by detecting a residual vibration waveform generated in a drive signal path when each nozzle 39 is driven to dispense ink via the residual vibration detection circuit.

A method of detecting the dispensing failure of the nozzle 39 by the control unit 11 will be further described with reference to FIG. 2.

The pattern storage unit 118 stores the temperature T, the humidity H, and the adjustment pattern group PG, in association with each other. Each of the adjustment pattern groups PG includes a plurality of adjustment patterns PT. For example, each of the adjustment pattern groups PG includes four adjustment patterns PT.

The adjustment pattern PT includes, for example, a first adjustment pattern PT1 to an eighth adjustment pattern PT8.

Figure 3:
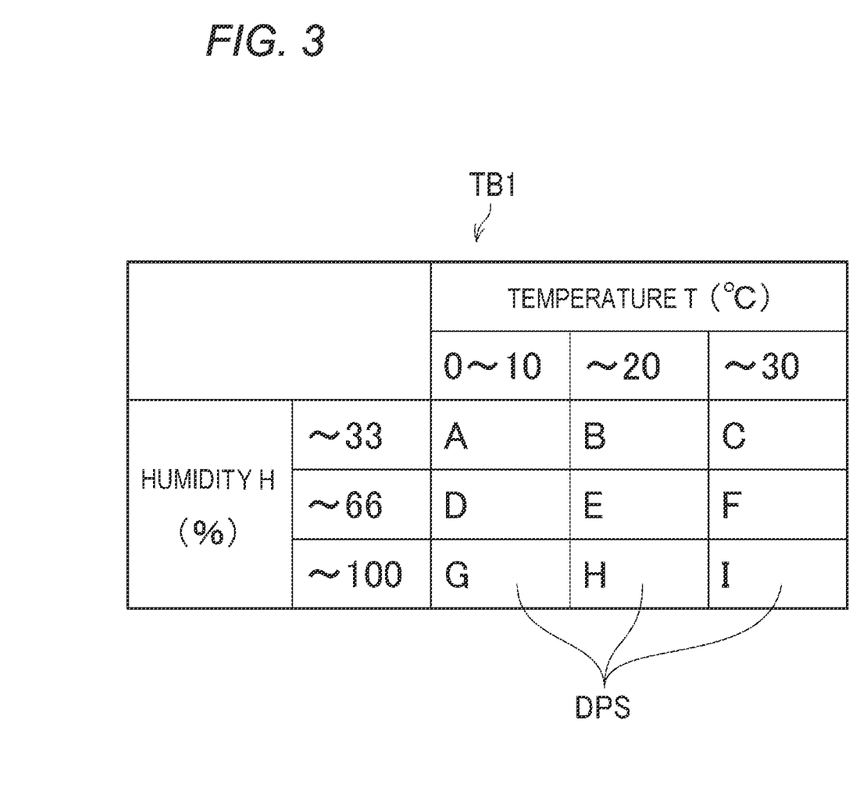
FIG. 3 is a table showing an example of a first table.
Figure 4:
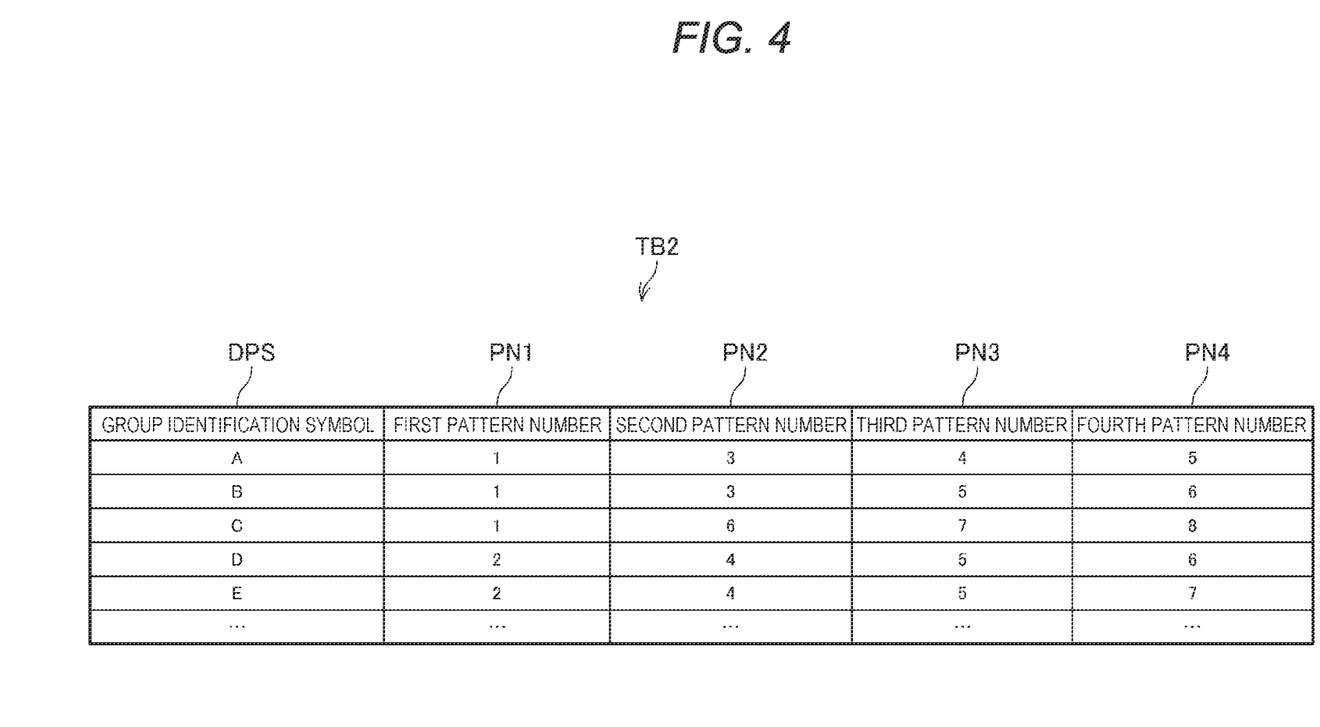
FIG. 4 is a table showing an example of a second table.

In the embodiment, the pattern storage unit 118 stores a first table TB1, a second table TB2, and the first adjustment pattern PT1 to eighth adjustment pattern PT8. The first table TB1 associates the temperature T and the humidity H with a group identification symbol DPS. The second table TB2 associates the group identification symbol DPS with the adjustment pattern PT. The group identification symbol DPS is a symbol for identifying the adjustment pattern group PG.

In the embodiment, the group identification symbol DPS is represented by alphabets from "A" to "I", for example.

The first table TB1 will be further described with reference to FIG. 3.

The second table TB2 will be further described with reference to FIG. 4.

The identification information storage unit 119 stores first group identification information DPG1 included in the print data DP. The first group identification information DPG1 is information for identifying the adjustment pattern group PG.

The first group identification information DPG1 is, for example, identification information of each of the plurality of adjustment patterns PT constituting the adjustment pattern group PG. The first group identification information DPG1 is, for example, a first pattern number PN1 to a fourth pattern number PN4.

The first pattern number PN1 to the fourth pattern number PN4 will be further described with reference to FIG. 4.

In the embodiment, a case where the first group identification information DPG1 is identification information of each of the plurality of adjustment patterns PT constituting the adjustment pattern group PG will be described, whereas the present disclosure is not limited thereto.

The first group identification information DPG1 may be, for example, the group identification symbol DPS corresponding to the adjustment pattern group PG.

The first group identification information DPG1 may include, for example, device identification information for identifying the multifunction peripheral 1. The first group identification information DPG1 may include, for example, date and time information when the data generation unit 112 generates the print data DP.

The acquisition unit 111 acquires the measured temperature TR and the measured humidity HR from the temperature and humidity sensor ST. The acquisition unit 111 acquires the measured temperature TR and the measured humidity HR, for example, when the acquisition unit 111 receives an instruction to adjust the print mechanism 15 in response to an operation from the user and the control unit 11 determines that there is no nozzle 39 having a dispensing failure.

The data generation unit 112 reads the adjustment pattern group PG corresponding to the measured temperature TR and the measured humidity HR acquired by the acquisition unit 111 from the pattern storage unit 118, and generates print data DP including the read adjustment pattern group PG.

For example, the data generation unit 112 determines the group identification symbol DPS of the adjustment pattern group PG corresponding to the measured temperature TR and the measured humidity HR with reference to the first table TB1. Further, the data generation unit 112 reads the adjustment patterns PT included in the adjustment pattern group PG corresponding to the determined group identification symbol DPS from the pattern storage unit 118 with reference to the second table TB2. In the embodiment, the adjustment patterns PT included in the adjustment pattern group PG are, for example, four adjustment patterns PT. Each of the four adjustment patterns PT is one of the first adjustment pattern PT1 to the eighth adjustment pattern PT8.

The data generation unit 112 determines the first group identification information DPG1 and generates an image indicating the first group identification information DPG1. For example, the data generation unit 112 generates a code CD indicating the first group identification information DPG1 as an example of an image indicating the first group identification information DPG1.

In other words, the data generation unit 112 determines the identification information of the plurality of adjustment patterns PT constituting the adjustment pattern group PG as the first group identification information DPG1. Then, the first group identification information DPG1 is encoded and converted into the code CD. The code CD is included in the print data DP. The code CD is, for example, a two-dimensional code. The code CD is, for example, a QR code (registered trademark).

In the embodiment, a case where the code CD is a two-dimensional code will be described, whereas the present disclosure is not limited thereto. The code CD may be, for example, a one-dimensional barcode.

The processing of the data generation unit 112 will be further described with reference to FIGS. 3 and 4.

The print control unit 113 prints the print data DP by the print mechanism 15, and generates an adjustment sheet SA which is the print medium M on which the image corresponding to the print data DP is printed. The print data DP includes four adjustment patterns PT and the code CD. That is, the adjustment patterns PT and the code CD are printed on the adjustment sheet SA.

The adjustment sheet SA will be further described with reference to FIGS. 5 and 6.

The image generation unit 114 reads, by the scanner mechanism 12, the adjustment pattern group PG formed on the adjustment sheet SA to generate the adjustment image group QG corresponding to the adjustment pattern group PG. The adjustment image group QG includes adjustment pattern images QT corresponding to the four adjustment patterns PT, respectively. The image generation unit 114 generates, by the scanner mechanism 12, the adjustment image group QG, for example, when the user places the adjustment sheet SA on a document placement surface of the scanner mechanism 12 and performs an operation of executing scanning.

The image generation unit 114 reads, by the scanner mechanism 12, the code CD formed on the adjustment sheet SA to generate the code image QC corresponding to the code CD.

The adjustment image group QG corresponds to an example of an "image group".

The adjustment unit 115 adjusts the print mechanism 15 based on the adjustment image group QG. Based on the adjustment image group QG, the adjustment unit 115 adjusts, for example, an ink dispensing amount for each of the plurality of nozzles 39 constituting the print mechanism 15.

For example, the adjustment unit 115 determines the adjustment pattern image QT having a best image quality among the four adjustment pattern images QT included in the adjustment image group QG. Further, for example, the adjustment unit 115 adjusts the print mechanism 15 so that the ink dispensing amount corresponding to the adjustment pattern image QT having the best image quality is dispensed from the nozzle 39.

The display control unit 116 decodes the code image QC generated by the image generation unit 114 and converts the code image QC into second group identification information DPG2. The second group identification information DPG2 is identification information of the plurality of adjustment patterns PT indicated by the code CD corresponding to the code image QC. The plurality of adjustment patterns PT indicated by the code CD constitute the adjustment pattern group PG.

Further, when the second group identification information DPG2 does not coincide with the first group identification information DPG1, the display control unit 116 displays a first error message by the display mechanism 14.

The first error message includes, for example, a character image indicating that "The adjustment sheet read by the scanner is not a correct adjustment sheet. Please print the adjustment sheet again and execute the adjustment."

When an elapsed time TE from a date and time when the print control unit 113 generates the adjustment sheet SA to a date and time when the image generation unit 114 reads the adjustment pattern group PG formed on the adjustment sheet SA is equal to or longer than a threshold value time SH, the display control unit 116 displays a second error message by the display mechanism 14. The threshold value time SH is, for example, 10 hours.

The threshold value time SH is set in accordance with a quality of the print image required for the multifunction peripheral 1. For example, when the multifunction peripheral 1 is a multifunction peripheral for business use, the required quality of the print image is higher than when the multifunction peripheral 1 is a multifunction peripheral for home use. In this case, the threshold value time SH is set to, for example, one hour. For example, when the multifunction peripheral 1 is a multifunction peripheral for home use, the required quality of the print image is lower than that when the multifunction peripheral 1 is a multifunction peripheral for business use. In this case, the threshold value time SH is set to, for example, 10 hours.

The second error message includes, for example, a character image indicating that "For the adjustment sheet read by the scanner, a long time elapsed since the adjustment sheet was printed. Please print the adjustment sheet again and execute the adjustment."

Next, the configuration of the print mechanism 15 will be described with reference to FIG. 2. FIG. 2 is a perspective view showing an example of the configuration of the print mechanism 15.

Figure 2:
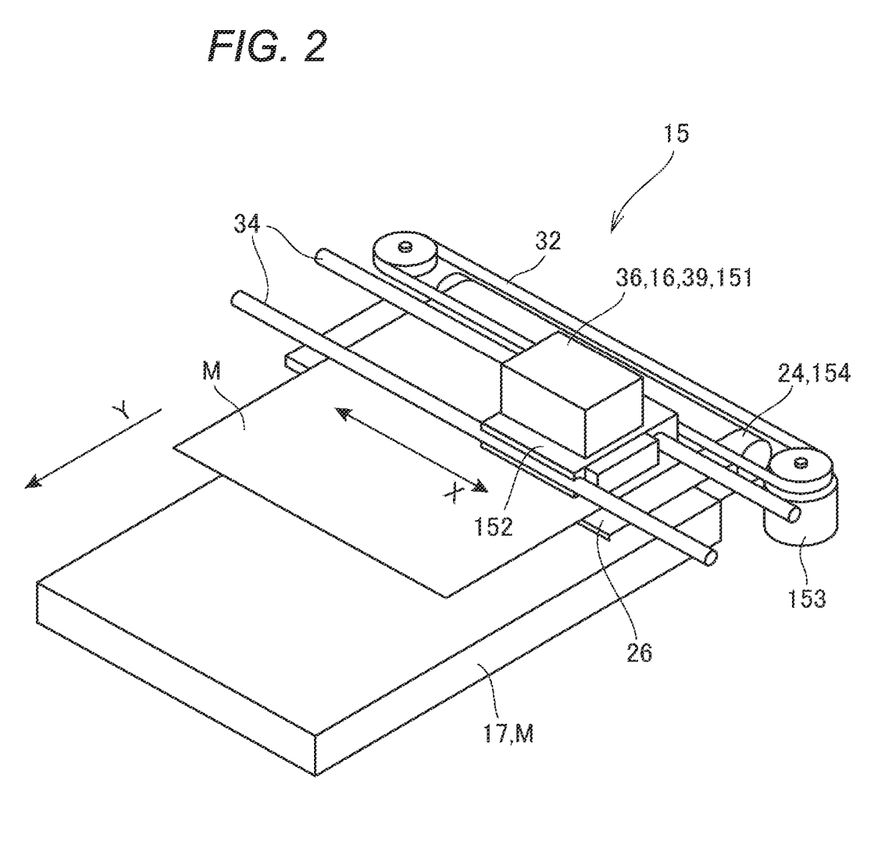
FIG. 2 is a perspective view showing an example of a configuration of a print mechanism.

As shown in FIG. 2, the print mechanism 15 includes the print medium accommodation unit 17, a paper feed roller 24, a platen 26, the carriage 152, the scanning motor 153, a pulling belt 32, and a guide rail 34.

The paper feed roller 24 is driven by the conveyance motor 154. The pulling belt 32 is driven by the scanning motor 153. The guide rail 34 supports the carriage 152 so as to be movable in the main scanning direction X. The carriage 152 is supported by the guide rail 34 and is driven in the main scanning direction X via the pulling belt 32 by the scanning motor 153.

A head unit 36 is mounted on the carriage 152.

The head unit 36 includes the ink supply unit 16 and the print head 151.

The ink supply unit 16 is attachable to and detachable from the carriage 152. The ink supply unit 16 includes, for example, four ink tanks. The ink tanks contain inks of different colors. For example, inks of colors of cyan (C), magenta (M), yellow (Y), and black (K) are stored in different ink tanks. The ink stored in the ink supply unit 16 is supplied to the print head 151.

The print head 151 includes a common liquid chamber (not shown), a pressure generation chamber (not shown), a piezoelectric element (not shown), and the nozzles 39. The plurality of nozzles 39 are disposed along the sub-scanning direction Y on a surface of the print head 151 facing the platen 26.

The pressure generation chambers and the piezoelectric elements are disposed in one-to-one correspondence with the nozzles 39. The plurality of the pressure generation chambers and the plurality of the piezoelectric elements are disposed along the sub-scanning direction Y similarly to the nozzles 39. The ink supplied from the ink supply unit 16 passes through the common liquid chamber and the pressure generation chamber, and is dispensed from the nozzles 39 onto the print medium M.

The piezoelectric element is a piezoelectric actuator in a flexural vibration mode or a piezoelectric actuator in a longitudinal vibration mode. In a state in which the ink is supplied to the pressure generation chamber, the piezoelectric element vibrates a vibration plate forming a part of the pressure generation chamber to cause pressure fluctuation in the pressure generation chamber, and the print head 151 dispenses the ink from the nozzle 39 to the print medium M by using the pressure fluctuation.

The vibration plate forming a part of the pressure generation chamber is in contact with the piezoelectric element and vibrates with the vibration of the piezoelectric element. The vibration of the vibration plate is stopped when driving of the piezoelectric element is stopped. When the driving of the piezoelectric element is stopped, the vibration of the vibration plate does not stop immediately, and residual vibration occurs in the vibration plate. Therefore, a piezoelectric element vibrates in accordance with the residual vibration of the vibration plate, and a signal caused by the residual vibration is output from the piezoelectric element. The signal caused by the residual vibration indicates a back electromotive voltage. A residual vibration detection circuit (not shown) provided in the print head 151 detects the signal caused by the residual vibration.

The control unit 11 detects, for each of the piezoelectric elements provided in the print head 151, the state of a signal corresponding to the residual vibration output from the piezoelectric element via the residual vibration detection circuit.

Frequency characteristics of a signal waveform corresponding to the residual vibration output from the piezoelectric element vary depending on an ink state inside the print head 151. The ink state includes a normal state, a state in which air bubbles are mixed, a state in which the viscosity of the ink is increased, and a state in which paper powder is in close contact. Therefore, the control unit 11 can identify the ink state inside the print head 151 by analyzing the frequency characteristics of the signal waveform output from the piezoelectric element.

Further, the control unit 11 detects a position of the nozzle 39 in which the ink dispensing failure occurs among the plurality of nozzles 39 based on the state of the signal corresponding to the residual vibration output from the piezoelectric element.

The print medium M is wound around the paper feed roller 24 from the print medium accommodation unit 17, and is conveyed in the sub-scanning direction Y along a surface of the platen 26. The carriage 152 is pulled by the pulling belt 32 driven by the scanning motor 153 and moves in the main scanning direction X along the guide rail 34. Further, the print head 151 mounted on the carriage 152 also moves in the main scanning direction X.

The main scanning direction X is perpendicular to the sub-scanning direction Y.

With this configuration, the print mechanism 15 alternately repeats a liquid dispensing operation in which the print head 151 dispenses the ink from the nozzles 39 while moving in the main scanning direction X, and a conveyance operation in which the print medium M is conveyed in the sub-scanning direction Y. As a result, the print mechanism 15 prints images such as characters and figures on the print medium M. That is, the print mechanism 15 alternately repeats a movement of the print head 151 in the main scanning direction X (main scanning) and a movement of the print medium M in the sub-scanning direction Y (sub-scanning). By these operations, the print mechanism 15 arranges rows of dots arranged along the main scanning direction X in the sub-scanning direction Y (sub-scanning direction), and prints the images such as characters and figures on the print medium M.

Next, the first table TB1 will be described with reference to FIG. 3. FIG. 3 is a table showing an example of the first table TB1. The first table TB1 is a table in which the temperature T and the humidity H are associated with the group identification symbol DPS.

As shown in FIG. 3, the temperature T is divided into three ranges of, for example, "equal to or higher than 0° C. and lower than 10° C.", "equal to or higher than 10° C. and lower than 20° C.", and "equal to or higher than 20° C. and equal to or lower than 30° C.". The humidity H indicates a relative humidity, and is divided into three ranges of, for example, "equal to or higher than 0% and lower than 33%", "equal to or higher than 33% and lower than 66%", and "equal to or higher than 66% and equal to or lower than 100%". The group identification symbol DPS is represented by alphabets from "A" to "I", for example.

In the embodiment, a case where the temperature T is divided into three ranges and the humidity H is divided into three ranges will be described, whereas the present disclosure is not limited thereto. The temperature T may be divided into, for example, four ranges, and the humidity H may be divided into, for example, four ranges. As the number of divisions increases, the data generation unit 112 can appropriately select the group identification symbol DPS. As the number of divisions decreases, a capacity of the pattern storage unit 118 can be reduced, and a processing amount of the data generation unit 112 can be reduced.

In the embodiment, a case where the group identification symbol DPS is represented by alphabets will be described, whereas the present disclosure is not limited thereto. The group identification symbol DPS may be information for identifying each of the adjustment pattern groups PG. The group identification symbol DPS may be represented by, for example, a number.

The measured temperature TR corresponds to an example of the temperature T. The measured humidity HR corresponds to an example of the humidity H.

For example, when the measured temperature TR is equal to or higher than 0° C. and lower than 10° C. and the measured humidity HR is equal to or higher than 0% and lower than 33%, the data generation unit 112 selects "A" as the group identification symbol DPS.

For example, when the measured temperature TR is equal to or higher than 10° C. and lower than 20° C. and the measured humidity HR is equal to or higher than 33% and lower than 66%, the data generation unit 112 selects "E" as the group identification symbol DPS.

For example, when the measured temperature TR is equal to or higher than 20° C. and lower than 30° C. and the measured humidity HR is equal to or higher than 66% and equal to or lower than 100%, the data generation unit 112 selects "I" as the group identification symbol DPS.

Next, the second table TB2 will be described with reference to FIG. 4. FIG. 4 is a table showing an example of the second table TB2. The second table TB2 is a table in which the group identification symbol DPS and the adjustment pattern PT are associated with each other.

As shown in FIG. 4, in the second table TB2, four pattern numbers PN are stored in association with one piece of group identification symbol DPS. The four pattern numbers PN includes the first pattern number PN1 to the fourth pattern number PN4.

The pattern number PN indicates which one of the first adjustment pattern PT1 to the eighth adjustment pattern PT8 the adjustment pattern PT is. For example, the pattern number PN of the first adjustment pattern PT1 is "1". For example, the pattern number PN of the eighth adjustment pattern PT8 is "8". In other words, the pattern number PN of a K-th adjustment pattern PTK is "K". The integer K is any integer of 1 to 8.

For example, when the group identification symbol DPS is "A", the first pattern number PN1 is "1", the second pattern number PN2 is "3", the third pattern number PN3 is "4", and the fourth pattern number PN4 is "5". Therefore, the data generation unit 112 generates the print data DP including the first adjustment pattern PT1, the third adjustment pattern PT3, the fourth adjustment pattern PT4, and the fifth adjustment pattern PT5 as the adjustment pattern group PG. In other words, the adjustment pattern group PG whose group identification symbol DPS is "A" includes the first adjustment pattern PT1, the third adjustment pattern PT3, the fourth adjustment pattern PT4, and the fifth adjustment pattern PT5.

For example, when the group identification symbol DPS is "E", the first pattern number PN1 is "2", the second pattern number PN2 is "4", the third pattern number PN3 is "5", and the fourth pattern number PN4 is "7". Therefore, the data generation unit 112 generates the print data DP including the second adjustment pattern PT2, the fourth adjustment pattern PT4, the fifth adjustment pattern PT5, and the seventh adjustment pattern PT7 as the adjustment pattern group PG. In other words, the adjustment pattern group PG whose group identification symbol DPS is "E" includes the second adjustment pattern PT2, the fourth adjustment pattern PT4, the fifth adjustment pattern PT5, and the seventh adjustment pattern PT7.

Next, the adjustment sheet SA, the adjustment pattern group PG, and the code CD will be described with reference to FIGS. 5 and 6. FIG. 5 is a diagram showing an example of the adjustment sheet SA, the adjustment pattern group PG, and the code CD.

In FIG. 5, a case where the adjustment sheet SA is an adjustment sheet SAA, the adjustment pattern group PG is an adjustment pattern group PGA, and the code CD is a code CDA will be described.

The adjustment sheet SAA is the adjustment sheet SA which is the print medium M on which the adjustment pattern group PGA is printed. The adjustment pattern group PGA indicates the adjustment pattern group PG whose group identification symbol DPS is "A". The code CDA indicates identification information of the adjustment pattern PT included in the adjustment pattern group PGA.

The adjustment pattern group PGA includes the first adjustment pattern PT1, the third adjustment pattern PT3, the fourth adjustment pattern PT4, and the fifth adjustment pattern PT5. The first adjustment pattern PT1, the third adjustment pattern PT3, the fourth adjustment pattern PT4, and the fifth adjustment pattern PT5 are arranged in order from left to right.

In FIG. 5, for convenience, the first pattern number PN1 to the fourth pattern number PN4 are described in association with the first adjustment pattern PT1, the third adjustment pattern PT3, the fourth adjustment pattern PT4, and the fifth adjustment pattern PT5, respectively. The print control unit 113 may not print the first pattern number PN1 to the fourth pattern number PN4 on the adjustment sheet SA.

A first mark M1 is printed at an upper left corner of the adjustment sheet SAA. The code CDA is printed at an upper right corner of the adjustment sheet SAA. The code CDA corresponds to an example of the code CD.

The first mark M1 is a mark for alignment when the user reads the adjustment sheet SAA by the scanner mechanism 12. For example, the user arranges the adjustment sheet SAA on the scanner mechanism 12 such that the first mark M1 is located at a corner of a reading region of a document table.

The code CDA indicates identification information of the four adjustment patterns PT included in the adjustment pattern group PGA. The code CDA indicates that, for example, the first pattern number PN1 is "1", the second pattern number PN2 is "3", the third pattern number PN3 is "4", and the fourth pattern number PN4 is "5".

FIG. 6 is a diagram showing another example of the adjustment sheet SA, the adjustment pattern group PG, and the code CD. In FIG. 6, a case where the adjustment sheet SA is an adjustment sheet SAE, the adjustment pattern group PG is an adjustment pattern group PGE, and the code CD is a code CDE will be described.

The adjustment sheet SAE is the adjustment sheet SA which is the print medium M on which the adjustment pattern group PGE is printed. The adjustment pattern group PGE indicates the adjustment pattern group PG whose group identification symbol DPS is "E". The code CDE indicates identification information of the adjustment pattern PT included in the adjustment pattern group PGE.

The adjustment pattern group PGE includes the second adjustment pattern PT2, the fourth adjustment pattern PT4, the fifth adjustment pattern PT5, and the seventh adjustment pattern PT7. The second adjustment pattern PT2, the fourth adjustment pattern PT4, the fifth adjustment pattern PT5, and the seventh adjustment pattern PT7 are arranged in order from left to right.

In FIG. 6, for convenience, the first pattern number PN1 to the fourth pattern number PN4 are described in association with the second adjustment pattern PT2, the fourth adjustment pattern PT4, the fifth adjustment pattern PT5, and the seventh adjustment pattern PT7, respectively. The print control unit 113 may not print the first pattern number PN1 to the fourth pattern number PN4 on the adjustment sheet SA.

The first mark M1 is printed at an upper left corner of the adjustment sheet SAE. The code CDE is printed at an upper right corner of the adjustment sheet SAE. The code CDE corresponds to an example of the code CD.

The first mark M1 is a mark for alignment when the user reads the adjustment sheet SAE by the scanner mechanism 12. For example, the user arranges the adjustment sheet SAE on the scanner mechanism 12 such that the first mark M1 is located at a corner of a reading region of a document table.

The code CDE indicates identification information of the four adjustment patterns PT included in the adjustment pattern group PGE. The code CDE indicates that, for example, the first pattern number PN1 is "2", the second pattern number PN2 is "4", the third pattern number PN3 is "5", and the fourth pattern number PN4 is "7".

Next, processing of the control unit 11 will be described with reference to FIGS. 7 and 8. Each of FIGS. 7 and 8 is a flowchart showing an example of the processing of the control unit 11.

Figure 7:
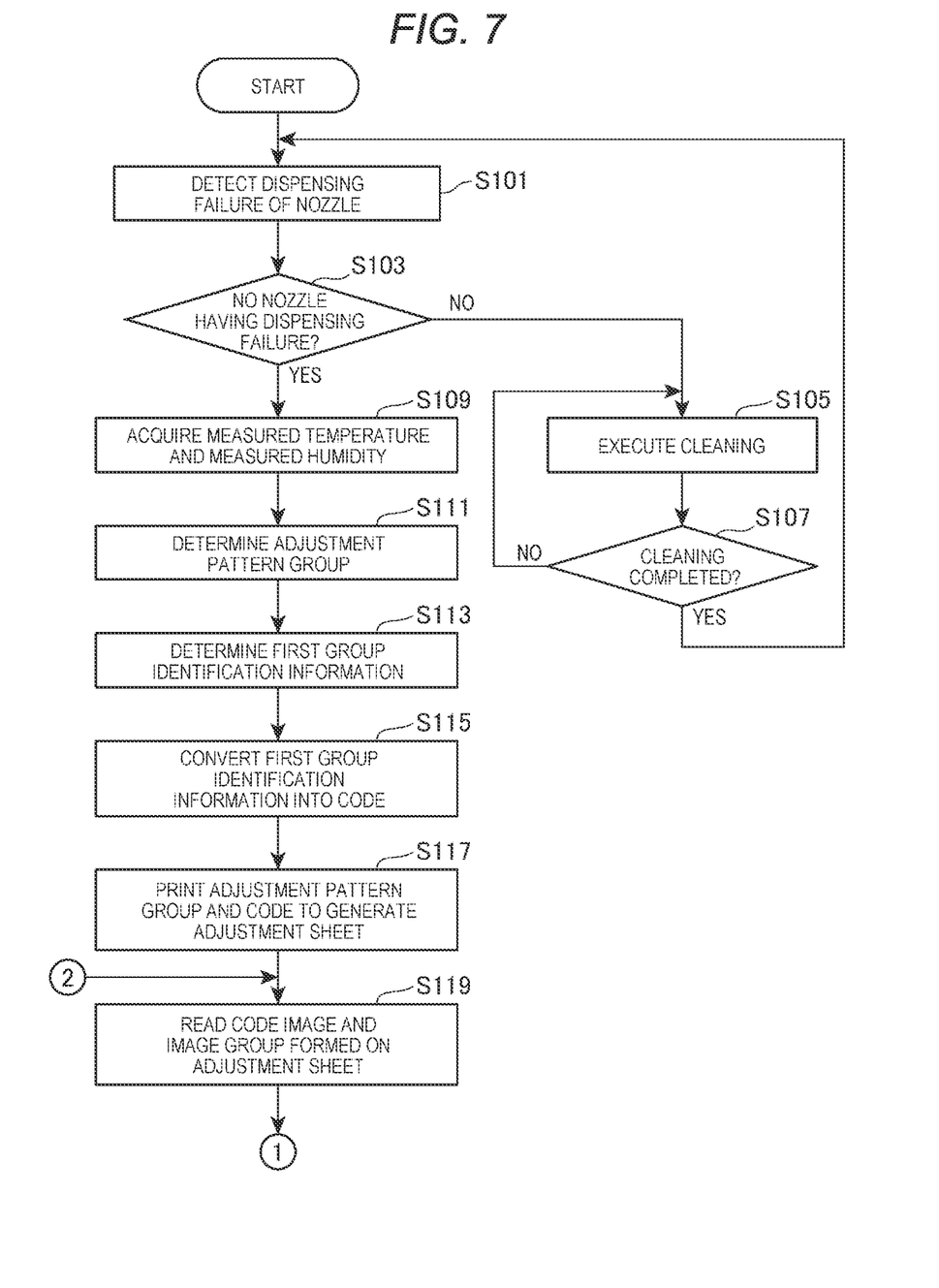
FIG. 7 is a flowchart showing an example of processing of a control unit.
Figure 8:
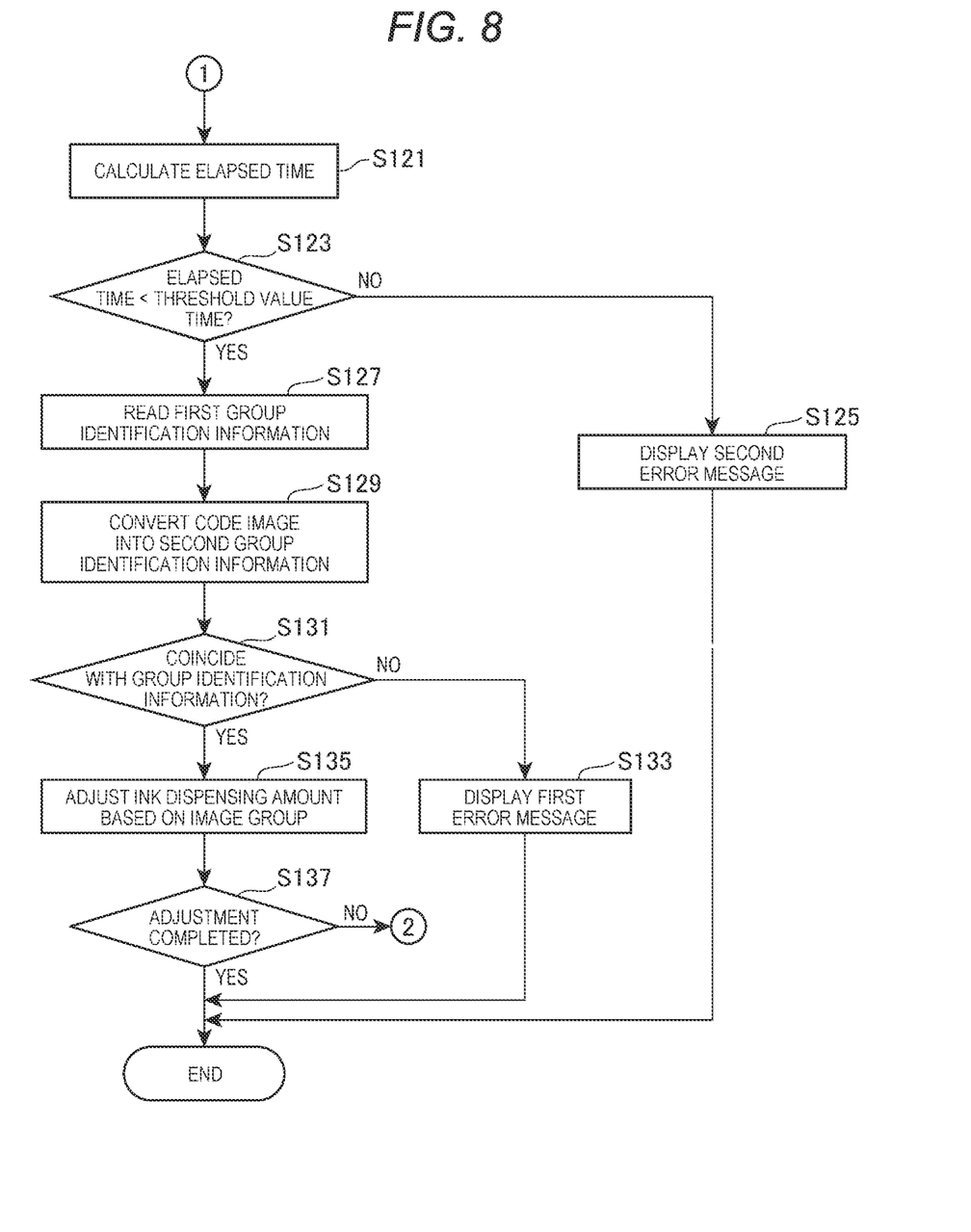
FIG. 8 is a flowchart showing the example of the processing of the control unit.

As shown in FIG. 7, first, in step S101, the control unit 11 detects a dispensing failure of the nozzle 39 disposed in the print head 151 of the print mechanism 15.

Next, in step S103, the control unit 11 determines whether there is the nozzle 39 having a dispensing failure.

When the control unit 11 determines that there is no nozzle 39 having the dispensing failure (step S103; YES), the processing proceeds to step S109. When the control unit 11 determines that there is the nozzle 39 having the dispensing failure (step S103; NO), the processing proceeds to step S105.

Then, in step S105, the control unit 11 executes cleaning of the print head 151.

Next, in step S107, the control unit 11 determines whether the cleaning of the print head 151 is completed.

When the control unit 11 determines that the cleaning of the print head 151 is not completed (step S107; NO), the processing returns to step S105. When the control unit 11 determines that the cleaning of the print head 151 is completed (step S107; YES), the processing returns to step S101.

In the case of YES in step S103, in step S109, the acquisition unit 111 acquires the measured temperature TR and the measured humidity HR from the temperature and humidity sensor ST.

Next, in step S111, the data generation unit 112 determines the adjustment pattern group PG corresponding to the measured temperature TR and the measured humidity HR. The data generation unit 112 reads the determined adjustment pattern group PG from the pattern storage unit 118.

Next, in step S113, the data generation unit 112 determines the first group identification information DPG1 corresponding to the adjustment pattern group PG. The first group identification information DPG1 is identification information of the plurality of adjustment patterns PT constituting the adjustment pattern group PG.

Next, in step S115, the data generation unit 112 encodes the first group identification information DPG1 and converts the first group identification information DPG1 into the code CD. The data generation unit 112 generates the print data DP including the adjustment pattern group PG and the code CD.

Next, in step S117, the print control unit 113 prints, by the print mechanism 15, the adjustment pattern group PG and the code CD to generate the adjustment sheet SA.

Next, in step S119, the image generation unit 114 reads, by the scanner mechanism 12, the adjustment pattern group PG and the code CD formed on the adjustment sheet SA to generate the adjustment image group QG and the code image QC.

Next, as shown in FIG. 8, in step S121, the display control unit 116 calculates the elapsed time TE from the date and time when the print control unit 113 generates the adjustment sheet SA to the date and time when the image generation unit 114 reads the adjustment pattern group PG formed on the adjustment sheet SA.

Next, in step S123, the display control unit 116 determines whether the elapsed time TE is less than the threshold value time SH.

When the display control unit 116 determines that the elapsed time TE is equal to or longer than the threshold value time SH (step S123; NO), the processing proceeds to step S125.

Then, in step S125, the display control unit 116 displays the second error message by the display mechanism 14. Thereafter, the processing ends.

When the display control unit 116 determines that the elapsed time TE is less than the threshold value time SH (step S123; YES), the processing proceeds to step S127.

Then, in step S127, the display control unit 116 reads the first group identification information DPG1 from the identification information storage unit 119.

Next, in step S129, the display control unit 116 decodes the code image QC and converts the code image QC into second group identification information DPG2.

Next, in step S131, the display control unit 116 determines whether the second group identification information DPG2 coincides with the first group identification information DPG1.

When the display control unit 116 determines that the second group identification information DPG2 does not coincide with the first group identification information DPG1 (step S131; NO), the processing proceeds to step S133.

Then, in step S133, the display control unit 116 displays the first error message by the display mechanism 14. Thereafter, the processing ends.

When the display control unit 116 determines that the second group identification information DPG2 coincides with the first group identification information DPG1 (step S131; YES), the processing proceeds to step S135.

Then, in step S135, the adjustment unit 115 adjusts, based on the adjustment image group QG generated in step S119, an ink dispensing amount for each of the plurality of nozzles 39 constituting the print mechanism 15.

Next, in step S137, the adjustment unit 115 determines whether the adjustment of the ink dispensing amount is completed.

When the adjustment unit 115 determines that the adjustment of the ink dispensing amount is not completed (step S137; NO), the processing returns to step S119 shown in FIG. 7. When the adjustment unit 115 determines that the adjustment of the ink dispensing amount is completed (step S137; YES), the processing ends thereafter.

Step S109 corresponds to an example of an "acquisition step". Steps S113 and S115 correspond to an example of a "data generation step".

As described above with reference to FIGS. 1 to 8, the multifunction peripheral 1 according to the embodiment includes the scanner mechanism 12, the inkjet-type print mechanism 15, the display mechanism 14, and the control unit 11 that controls the scanner mechanism 12, the print mechanism 15, and the display mechanism 14. The control unit 11 includes the pattern storage unit 118 that stores the temperature T, the humidity H, and the adjustment pattern group PG including a plurality of adjustment patterns, in association with each other, the acquisition unit 111 that acquires the measured temperature TR and the measured humidity HR from the temperature and humidity sensor ST, and the data generation unit 112 that reads the adjustment pattern group PG corresponding to the measured temperature TR and the measured humidity HR acquired by the acquisition unit 111 from the pattern storage unit 118 and generates the print data DP including the read adjustment pattern group PG and the first group identification information DPG1 which is information for identifying the adjustment pattern group PG.

According to this configuration, the adjustment pattern group PG corresponding to the measured temperature TR and the measured humidity HR acquired from the temperature and humidity sensor ST is read from the pattern storage unit 118, and the print data DP including the read adjustment pattern group PG and the first group identification information DPG1 which is information for identifying the adjustment pattern group PG is generated.

Therefore, it is possible to print the appropriate adjustment pattern group PG according to the use environment (temperature and humidity) and the first group identification information DPG1 which is information for identifying the adjustment pattern group PG. Therefore, the print mechanism 15 can be appropriately adjusted according to the use environment.

It is possible to determine whether an adjustment pattern printed on an inappropriate adjustment sheet is read by the scanner based on the first group identification information DPG1. Therefore, it is possible to prevent the print mechanism 15 from being adjusted based on the adjustment pattern printed on the inappropriate adjustment sheet.

The multifunction peripheral 1 according to the embodiment includes the print control unit 113 that prints, by the print mechanism 15, the print data DP and generates the adjustment sheet SA which is the print medium M on which an image corresponding to the print data DP is printed, the image generation unit 114 that reads, by the scanner mechanism 12, the adjustment pattern group PG formed on the adjustment sheet SA and generates the adjustment image group QG corresponding to the adjustment pattern group PG, and the adjustment unit 115 that adjusts the ink dispensing amount for each of the plurality of nozzles 39 constituting the print mechanism 15 based on the adjustment image group QG.

According to this configuration, the scanner mechanism 12 reads the adjustment pattern group PG formed on the adjustment sheet SA to generate the adjustment image group QG corresponding to the adjustment pattern group PG, and the ink dispensing amount is adjusted for each of the plurality of nozzles 39 constituting the print mechanism 15 based on the adjustment image group QG.

Therefore, the ink dispensing amount can be adjusted for each of the plurality of nozzles 39 based on the adjustment image group QG. Therefore, it is possible to appropriately adjust the ink dispensing amount according to the use environment (temperature and humidity).

In the multifunction peripheral 1 according to the embodiment, the image generation unit 114 reads, by the scanner mechanism 12, the image corresponding to the first group identification information DPG1 formed on the adjustment sheet SA to acquire the second group identification information DPG2. The control unit 11 includes the identification information storage 119 that stores the first group identification information DPG1 included in the print data DP, and the display control unit 116 that displays, by the display mechanism 14, the first error message when the second group identification information DPG2 does not coincide with the first group identification information DPG1.

According to this configuration, the image corresponding to the first group identification information DPG1 formed on the adjustment sheet SA is read to acquire the second group identification information DPG2. When the second group identification information DPG2 does not coincide with the first group identification information DPG1, the first error message is displayed on the display mechanism 14.

Therefore, when the second group identification information DPG2 does not coincide with the first group identification information DPG1, the first error message is displayed on the display mechanism 14, so that the user can visually recognize that an inappropriate adjustment sheet SA is read by the scanner mechanism 12. Therefore, the convenience of the user can be improved. It is possible to prevent the print mechanism 15 from being adjusted based on the adjustment pattern group PG formed on the inappropriate adjustment sheet SA.

In the multifunction peripheral 1 according to the embodiment, the print control unit 113 prints, by the print mechanism 15, the code CD corresponding to the first group identification information DPG1. The image generation unit 114 reads, by the scanner mechanism 12, the code CD formed on the adjustment sheet SA to acquire the second group identification information DPG2 corresponding to the code CD.

According to this configuration, the image generation unit 114 reads the code CD formed on the adjustment sheet SA, and acquires the second group identification information DPG2 corresponding to the code CD. Therefore, the second group identification information DPG2 can be acquired by simple processing. Therefore, the processing of the image generation unit 114 can be simplified.

In the multifunction peripheral 1 according to the embodiment, the first group identification information DPG1 includes the identification information of each of the plurality of adjustment patterns PT constituting the adjustment pattern group PG.

According to this configuration, the first group identification information DPG1 includes the identification information of each of the plurality of adjustment patterns PT constituting the adjustment pattern group PG.

Therefore, it is possible to appropriately determine whether the second group identification information DPG2 coincides with the first group identification information DPG1. Therefore, it is possible to appropriately determine whether the adjustment sheet SA read by the scanner mechanism 12 is an appropriate adjustment sheet SA. Therefore, it is possible to prevent the print mechanism 15 from being adjusted based on the adjustment pattern group PG formed on the inappropriate adjustment sheet SA.

In the multifunction peripheral 1 according to the embodiment, the first group identification information DPG1 includes the device identification information for identifying the multifunction peripheral 1.

According to this configuration, the first group identification information DPG1 includes the device identification information for identifying the multifunction peripheral 1.

Therefore, when the adjustment sheet SA printed by another multifunction peripheral is read, it can be determined that the second group identification information DPG2 does not coincide with the first group identification information DPG1. Therefore, it is possible to prevent the print mechanism 15 from being adjusted based on the adjustment pattern group PG formed on the adjustment sheet SA printed by another multifunction peripheral.

In the multifunction peripheral 1 according to the embodiment, the first group identification information DPG1 includes the date and time information on the generation of the print data DP.

According to this configuration, it is possible to determine whether the adjustment sheet SA is an appropriate adjustment sheet SA based on the date and time indicated by the second group identification information DPG2 and the date and time indicated by the first group identification information DPG1. Therefore, it is possible to prevent the print mechanism 15 from being adjusted based on the adjustment pattern group PG formed on the inappropriate adjustment sheet SA.

In the multifunction peripheral 1 according to the embodiment, when the elapsed time TE from the date and time when the print control unit 113 generates the adjustment sheet SA to the date and time when the image generation unit 114 reads the adjustment pattern group PG formed on the adjustment sheet SA is equal to or longer than the threshold value time SH, the display control unit 116 displays the second error message by the display mechanism 14.

According to this configuration, when the elapsed time TE from the date and time when the print control unit 113 generates the adjustment sheet SA to the date and time when the image generation unit 114 reads the adjustment pattern group PG formed on the adjustment sheet SA is equal to or longer than the threshold value time SH, the display control unit 116 displays the second error message by the display mechanism 14.

Therefore, by setting the threshold value time SH to an appropriate value, it is possible to appropriately determine whether the adjustment sheet SA read by the scanner mechanism 12 is an appropriate adjustment sheet SA. Therefore, it is possible to prevent the print mechanism 15 from being adjusted based on the adjustment pattern group PG formed on the inappropriate adjustment sheet SA.

In the multifunction peripheral 1 according to the embodiment, the threshold value time SH is set in accordance with a quality of a print image required for the multifunction peripheral 1.

According to this configuration, the threshold value time SH is set in accordance with the quality of the print image required for the multifunction peripheral 1.

Therefore, the threshold value time SH can be appropriately set. Therefore, it is possible to appropriately determine whether the adjustment sheet SA is an appropriate adjustment sheet SA.

In the control method of the multifunction peripheral 1 according to the embodiment, the multifunction peripheral 1 includes the scanner mechanism 12, the inkjet-type print mechanism 15, the display mechanism 14, and the control unit 11 that controls the scanner mechanism 12, the print mechanism 15, and the display mechanism 14. The control unit 11 includes the pattern storage unit 118 that stores the temperature T, the humidity H, and the adjustment pattern group PG including a plurality of adjustment patterns, in association with each other. The control unit executes an acquisition step of acquiring the measured temperature TR and the measured humidity HR from the temperature and humidity sensor ST, and a data generation step of reading the adjustment pattern group PG corresponding to the measured temperature TR and the measured humidity HR acquired in the acquisition step from the pattern storage unit 118 and generating the print data DP including the read adjustment pattern group PG and the first group identification information DPG1 which is information for identifying the adjustment pattern group PG.

According to this configuration, the same effects as those of the multifunction peripheral 1 according to the embodiment can be obtained.

The embodiment shows an aspect, and any modifications and applications can be made without departing from the spirit of the embodiment.

In the embodiment, a case where the "image forming device" is the multifunction peripheral 1 is described, whereas the present disclosure is not limited thereto. The "image forming device" may include the print mechanism 15. For example, the "image forming device" may be a printer. In this case, the printer needs to be communicably connected to a scanner separate from the printer.

In the embodiment, a control method implemented by the processor 11A included in the multifunction peripheral 1 executing the control program PGM is described, whereas the control program PGM executed by the processor 11A in order to implement the control method may be implemented in the form of a recording medium in which the control program PGM is recorded in a computer-readable manner or a transmission medium that transmits the control program PGM.

As the recording medium, a magnetic or optical recording medium or a semiconductor memory device can be used. Examples of the recording medium include portable or fixed recording media such as a flexible disk, an HDD, a compact disk read only memory (CD-ROM), a digital versatile disk (DVD), a Blu-ray (registered trademark) disc, a magneto-optical disk, a flash memory, and a card-type recording medium.

The recording medium may be a non-volatile storage device such as a RAM, a ROM, or an HDD, which is an internal storage device included in the multifunction peripheral 1.

The function of the control unit 11 may be implemented by one or more processors or a semiconductor chip. The control unit 11 may further include a co-processor such as a system-on-a-chip (SoC), a micro control unit (MCU), or a field-programmable gate array (FPGA). The control unit 11 may cause both the CPU and the co-processor to cooperate with each other, or may perform various types of control by selectively using one of the CPU and the co-processor.

Processing units of the flowcharts of FIGS. 7 and 8 are divided according to main processing contents in order to facilitate understanding of the processing of the control unit 11, and are not limited by the way of dividing the processing units and the names thereof. The processing unit of the flowchart may be divided into more processing units according to the processing content. One processing unit may be divided so as to include more processing. The order of the processing may be appropriately changed as long as there is no problem in the spirit.

Each functional unit shown in FIG. 1 shows a functional configuration, and a specific implementation form is not particularly limited. It is not always necessary to implement hardware individually corresponding to each functional unit, and it is also possible to adopt a configuration in which the functions of a plurality of functional units are implemented by one processor executing a program. A part of the functions implemented by software in the above-described embodiment may be hardware, or a part of the functions implemented by hardware may be software. In addition, specific detailed configurations of other units of the multifunction peripheral 1 can be freely changed without departing from the spirit of the disclosure.

What is claimed is:

1. An image forming device comprising:
    a scanner mechanism;
    an inkjet-type print mechanism;
    a display mechanism; and
    a control unit configured to control the scanner mechanism, the print mechanism, and the display mechanism,
    wherein
    the control unit includes:
        a memory configured to store a temperature, a humidity, and an adjustment pattern group including a plurality of adjustment patterns, in association with each other; and,
        a processor configured to execute a control program, the processing being:
        configured to acquire a measured temperature and a measured humidity from a temperature and humidity sensor,
        configured to read an adjustment pattern group corresponding to the measured temperature and the measured humidity acquired by the processor from the memory, and generate print data including the read adjustment pattern group and first group identification information which is information for identifying the adjustment pattern group, and
        configured to read, by the scanner mechanism, the adjustment pattern group formed on an adjustment sheet and generate an image group corresponding to the adjustment pattern group,
        configured to read, by the scanner mechanism, an image corresponding to group identification information formed on the adjustment sheet, and acquire second group identification information,
        when an elapsed time from a date and time when the processor generates the adjustment sheet to a date and time when the processor reads the adjustment pattern group formed on the adjustment sheet is equal to or longer than a threshold value time, the processor displays an error message by the display mechanism, and
        the threshold value time is set in accordance with a quality of a print image required for the image forming device.

2. The image forming device according to claim 1, wherein
    the processor is configured to print, by the print mechanism, the print data and generate an adjustment sheet which is a print medium on which an image corresponding to the print data is printed; and
    the processor is configured to adjust, based on the image group, an ink dispensing amount for each of a plurality of nozzles constituting the print mechanism.

3. The image forming device according to claim 2, wherein
    the processor is configured to read, by the scanner mechanism, the image corresponding to the group identification information formed on the adjustment sheet, and acquire the second group identification information, and
    the control unit includes
        the memory being configured to store the first group identification information included in the print data, and
        the processor being configured to display, by the display mechanism, an error message when the second group identification information does not coincide with the first group identification information.

4. The image forming device according to claim 3, wherein
    the processor is configured to print, by the print mechanism, a code corresponding to the first group identification information, and
    the processor is configured to read, by the scanner mechanism, a code formed on the adjustment sheet and acquire second group identification information corresponding to the code.

5. The image forming device according to claim 3, wherein
    the first group identification information includes identification information of each of a plurality of adjustment patterns constituting the adjustment pattern group.

6. The image forming device according to claim 3, wherein
    the first group identification information includes device identification information for identifying the image forming device.

7. The image forming device according to claim 3, wherein
    the first group identification information includes date and time information when the print data is generated.

8. A control method of an image forming device, wherein the image forming device includes
    a scanner mechanism,
    an inkjet-type print mechanism,
    a display mechanism, and
    a control unit configured to control the scanner mechanism, the print mechanism, and the display mechanism, the control unit includes a memory configured to store a temperature, a humidity, and an adjustment pattern group including a plurality of adjustment patterns, in association with each other, and the control unit executes
- an acquisition step of acquiring a measured temperature and a measured humidity from a temperature and humidity sensor; and
- a data generation step of reading an adjustment pattern group corresponding to the measured temperature and the measured humidity acquired in the acquisition step from the memory, and generating print data including the read adjustment pattern group and first group identification information which is information for identifying the adjustment pattern group, wherein, when an elapsed time from a date and time when the control unit generates an adjustment sheet to a date and time when the control unit reads the adjustment pattern group formed on the adjustment sheet is equal to or longer than a threshold value time, the control unit displays an error message by the display mechanism, and the threshold value time is set in accordance with a quality of a print image required for the image forming device.

\* \* \* \* \*